Figure 1:
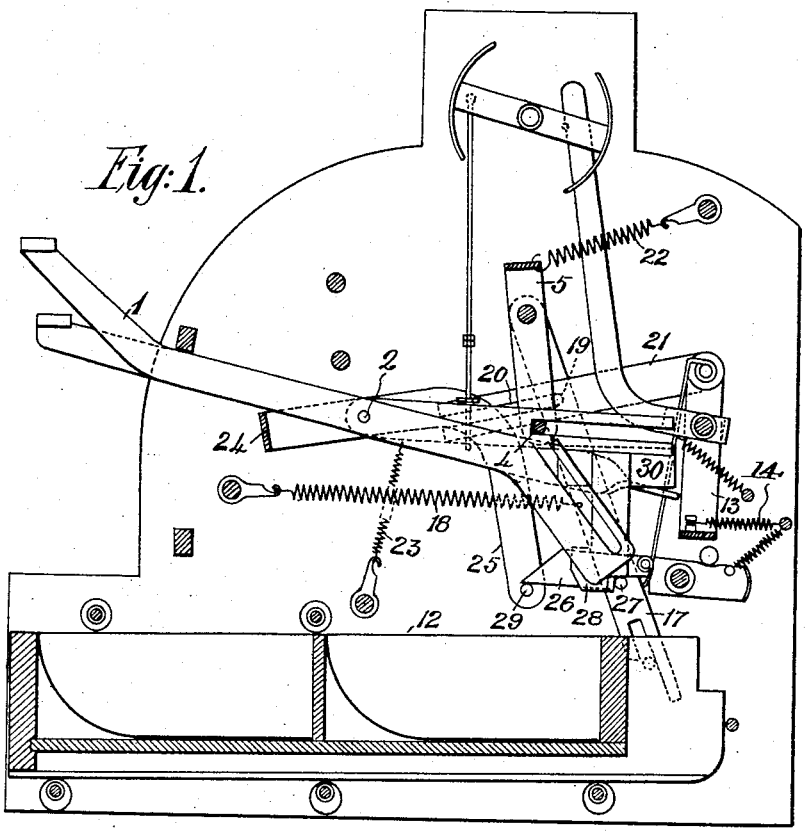

A. J. H. BURNETT.
CASH REGISTER AND TRANSFER MECHANISM.
APPLICATION FILED NOV. 11, 1915.

1,175,862.

Patented Mar. 14, 1916.
6 SHEETS—SHEET 1.

WITNESS

INVENTOR,
Arthur John Herbert Burnett,
per
Attorneys.

Fig: 2.

A. J. H. BURNETT.
CASH REGISTER AND TRANSFER MECHANISM.
APPLICATION FILED NOV. 11, 1915.

1,175,862.

Patented Mar. 14, 1916.
6 SHEETS—SHEET 3.

WITNESS
E. D. Bartles

INVENTOR,
Arthur John Herbert Burnett,
per Knight Bros.
Attorneys.

THE COLUMBIA PLANOGRAPH CO., WASHINGTON, D. C.

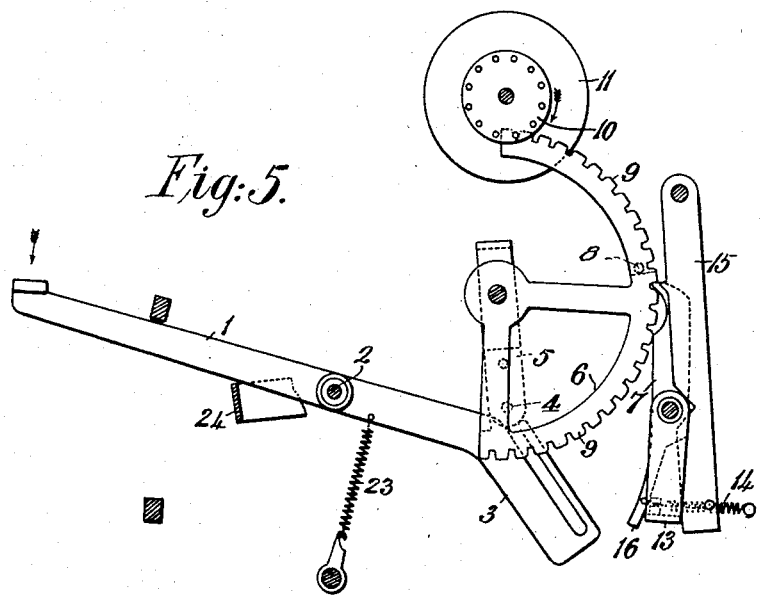
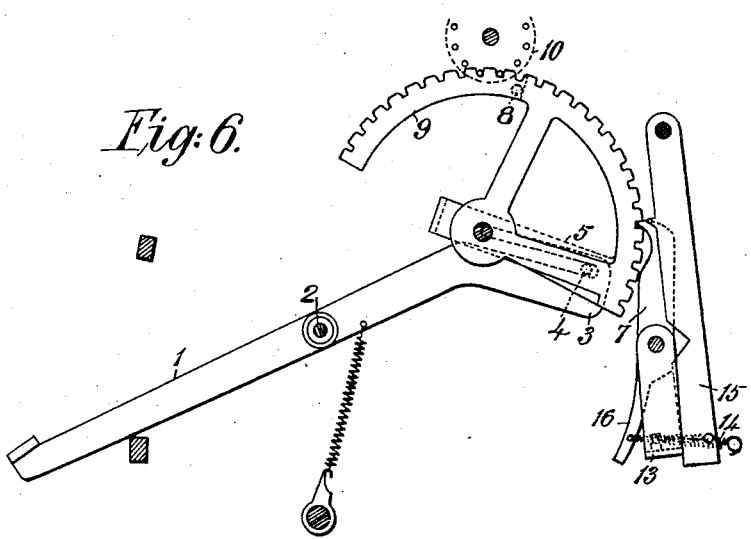

A. J. H. BURNETT.
CASH REGISTER AND TRANSFER MECHANISM.
APPLICATION FILED NOV. 11, 1915.
1,175,862.
Patented Mar. 14, 1916.
6 SHEETS—SHEET 5.
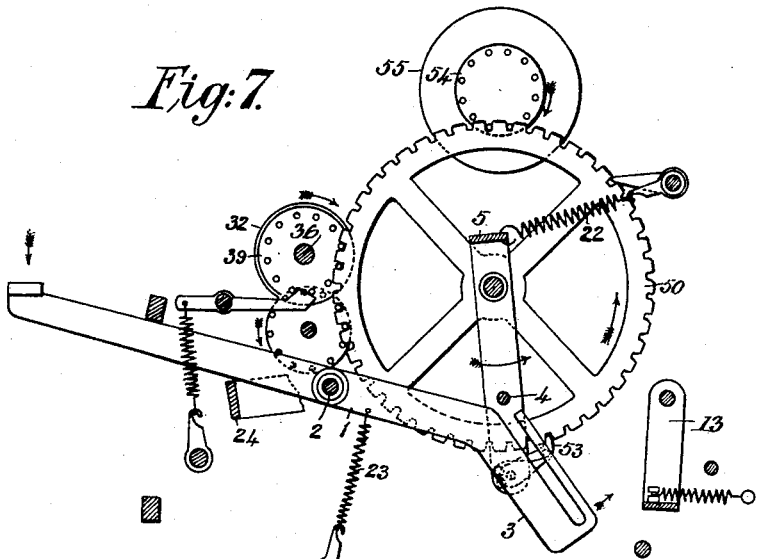
Fig:7.
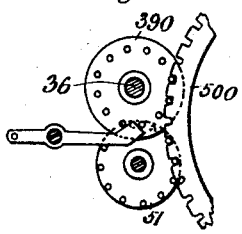
Fig:9.
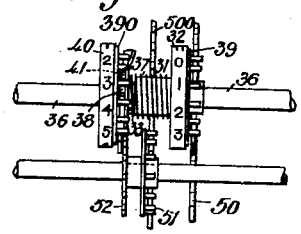
Fig:8.
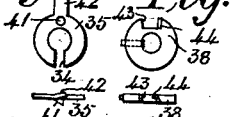
Fig:10. Fig:12.
Fig:11. Fig:13.
WITNESS
INVENTOR
Arthur John Herbert Burnett,
per Knight Bros
Attorneys.

A. J. H. BURNETT.
CASH REGISTER AND TRANSFER MECHANISM.
APPLICATION FILED NOV. 11, 1915.

1,175,862.

Patented Mar. 14, 1916.
6 SHEETS—SHEET 6.

WITNESS
E. D. Bartlett

INVENTOR,
Arthur John Herbert Burnett,
per
Knight Bros
Attorneys.

UNITED STATES PATENT OFFICE.

ARTHUR JOHN HERBERT BURNETT, OF LONDON, ENGLAND, ASSIGNOR OF ONE-HALF TO GEORGE WILLIAM GRICE-HUTCHINSON, OF LONDON, ENGLAND.

CASH-REGISTER AND TRANSFER MECHANISM.

1,175,862.

Specification of Letters Patent.

Patented Mar. 14, 1916.

Application filed November 11, 1915. Serial No. 60,942.

*To all whom it may concern:*

Be it known that I, ARTHUR JOHN HERBERT BURNETT, a subject of the King of Great Britain, residing at 30 Bedford Row, London, England, have invented new and useful Improvements in Cash-Registers and Transfer Mechanism, of which the following is a specification.

This invention relates to cash registers, and its object is a cash register having several series of key levers pivoted on a main shaft and corresponding to the various coin denominations up to the amount the machine is designed to register.

Another object of the invention is a cash register in which all the key levers have the same amplitude of movement and transfer to the indicating mechanism the necessary proportion of the movement of each key.

A further object consists of a machine with a series of key levers, the inner ends of which are set at different angles and engage with a certain pivotal movement with the crossbar of a spring-controlled frame.

More particularly defined the invention consists of providing said spring-controlled frame with a quadrant wheel on one side adapted to engage with a pin projecting from a quadrant wheel in engagement with a star wheel mounted upon a shaft carrying and integral with a cash indicating drum. The spring-controlled frame carries on its other side a pawl in engagement with a wheel meshing with a star wheel integral with a totalizing drum.

The invention further consists in means insuring that the cash indicating drum is held in a position indicating the last transaction until another transaction has been completed. More specifically this means comprises mechanism coöperating with a cash drawer in such a manner that the return of the cash drawer to its closed position after a transaction operates a cradle or frame extending throughout the back of the cash register. This frame further allows a pawl member to drop in engagement with the quadrant wheel in engagement with the pin wheel of the cash indicating drum, and then releases the pawl member holding up the spring-controlled frame operated by the key levers. This frame is thus released and is allowed to return with the key lever to the original position of these parts. Further, in accordance with the invention the downward movement of any key lever operates a pivotally mounted yoke extending across the front of the machine, and by means of a lever arm projecting from this yoke trips the catch holding the cash drawer which moves forward a certain distance and then engages a second catch. By this means the back frame is moved so as to move out of engagement the pawl member holding the quadrant wheel which retains the cash indicating drum in the position it was last set at the last transaction. Further movement of the key forces the front yoke downward and lifts the lever arm upward until it engages with an arm projecting from the second catch and raises this catch and releases the cash drawer. The time occupied between the release of the first and second catch allows of the cash indicating drum being set for the transaction before the drawer is released.

A transfer mechanism is disclosed in the present specification in connection with the cash register of the present invention, and forms the subject matter of and is claimed in British Patent No. 4677 dated 25th March 1915 but is not herein claimed.

Yet a further object of the present invention consists of an alternate transfer mechanism which may be employed also in connection with other calculating machines.

The invention further consists in a transfer mechanism in which a tooth or projection upon the numeral drum of one denomination causes a pawl carrying member to rock once in each revolution of that numeral drum. The pawl carried by that member either rocks the receiving wheel of the next denomination directly or through an interposed gear wheel. The gear wheels are preferably pin wheels, which is quite satisfactory for this type of machine, although, if desired, they may, of course, have cut teeth, which as a matter of fact generally results in a heavier and more expensive construction.

The present invention finally consists in the various combinations of parts herein claimed.

The invention is herein described as applied to a cash register for pounds, shillings and pence, but of course is equally applicable by suitably designing the numeral drums and corresponding parts, for any other coin denominations, such as dollars, francs and so forth.

Some embodiments of the invention are illustrated in the accompanying drawings, in which—

Figure 2:
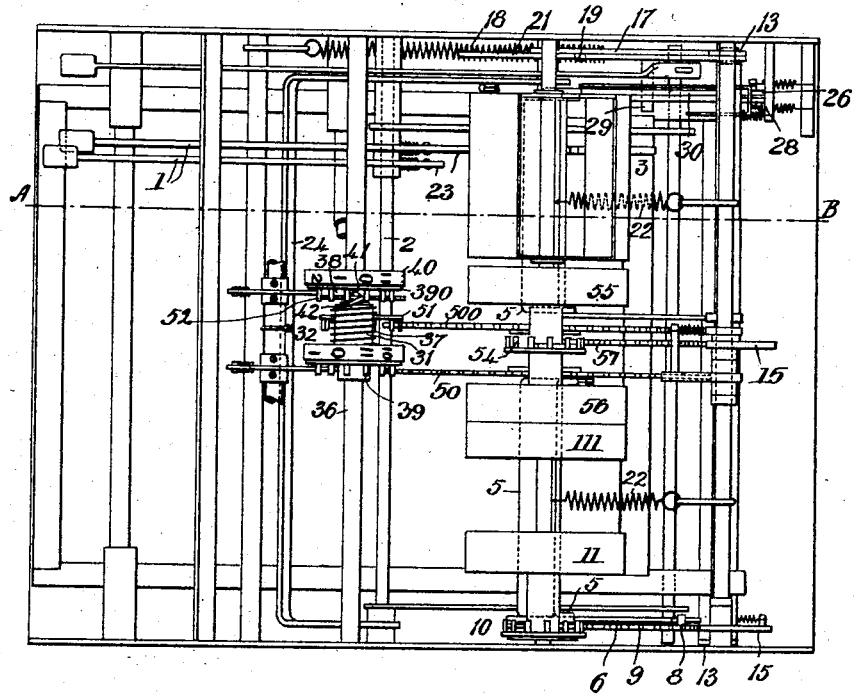
Figure 3:
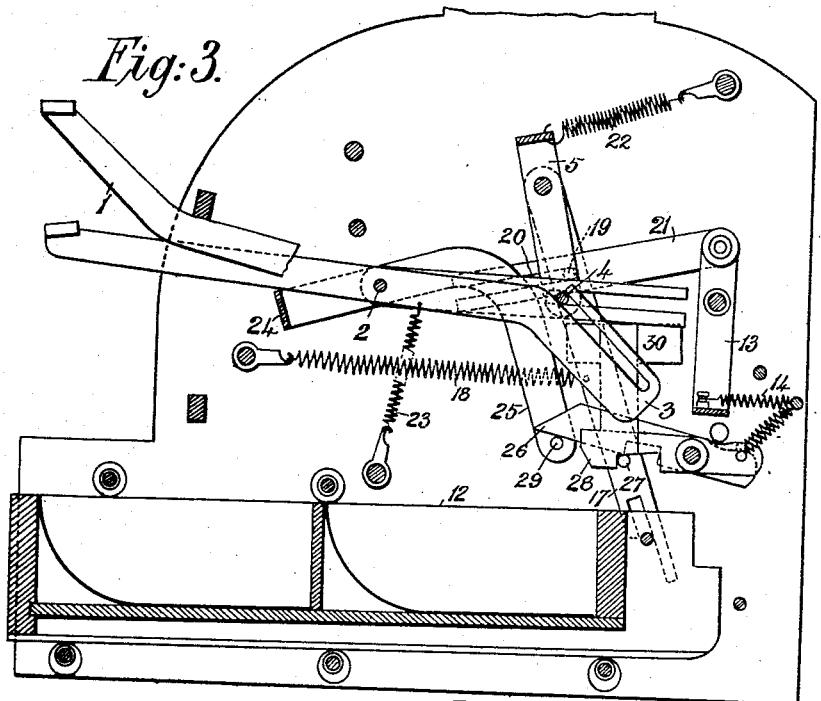
Figure 4:
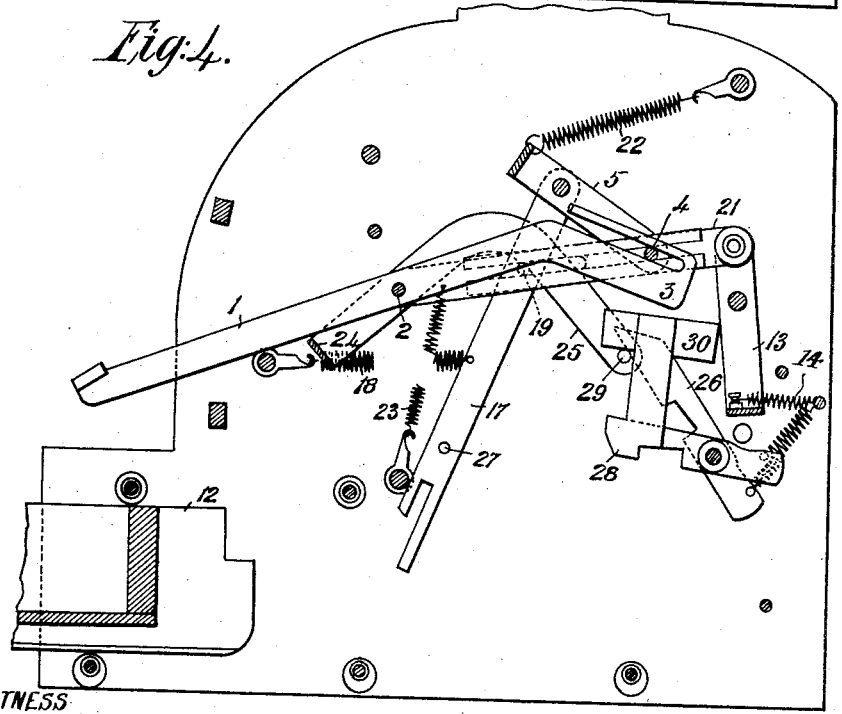
Figure 14:
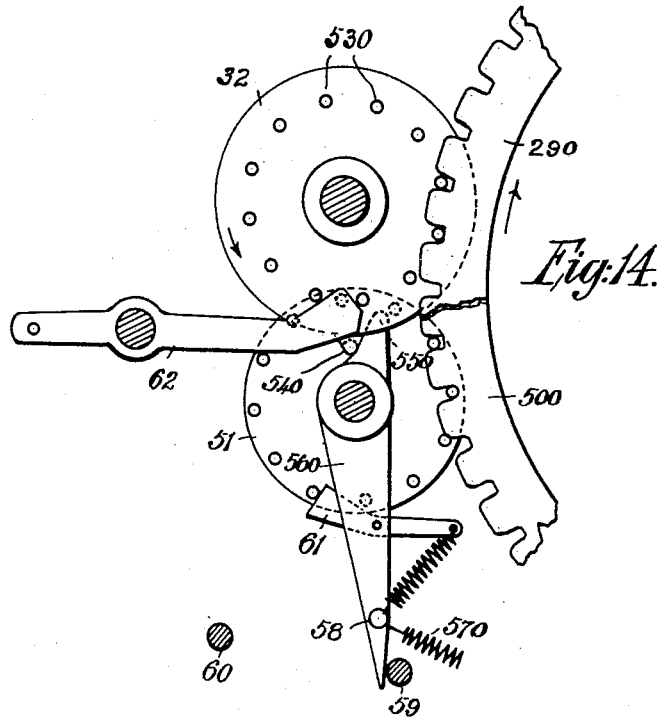
Figure 15:
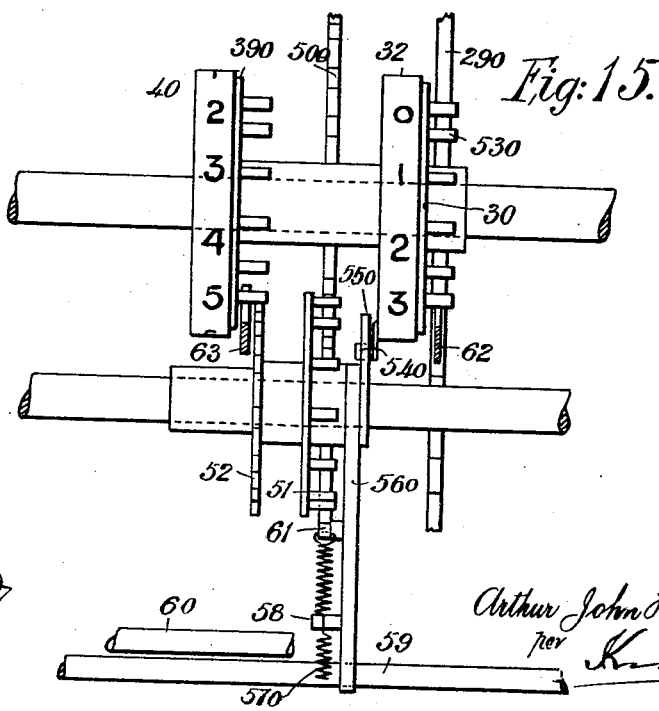

Figure 1 is a sectional side elevation on the line A—B of Fig. 2; Fig. 2 is a plan view showing a machine with two series or banks of keys for transactions in shillings and pence; Fig. 3 is a side elevation of the trip mechanism for releasing the cash drawer; Fig. 4 is a view of the trip mechanism shown in Fig. 3 in the position in which the cash drawer is fully extended; Fig. 5 is a view of a key lever and train of mechanism connecting said lever with the cash indicating drum; Fig. 6 is a view showing the position of a key lever and train of mechanism shown in Fig. 5 in the position in which the key lever is depressed; Fig. 7 is a view showing a key lever and the train of mechanism for operating the totalizing and indicating drum; Fig. 8 is a front elevation of the transfer mechanism shown applied to the totalizing mechanism of the cash register in Fig. 2; Fig. 9 is a side view of Fig. 8; Fig. 10 is a side view of the transfer disk and arm; Fig. 11 is a plan view of Fig. 10; Fig. 12 is a side view of the fixed collar; Fig. 13 is a plan of Fig. 12; Fig. 14 is an end view of the complete transfer mechanism herein claimed; and Fig. 15 is a front view of same.

Referring now to the drawings, and particularly to Figs. 1, 2, 5 and 6—1 indicates the key levers pivoted in series or banks on a main shaft 2 and corresponding in number with the pence, shillings, etc., up to the amount the machine is designed to register. The inner ends 3 of each series or banks of the key levers are set at different angles so as to engage after a small pivotal movement with a cross bar 4 shown in dotted lines in Figs. 5 and 6 of a corresponding spring-controlled cradle 5 carrying a quadrant wheel 6 on the right hand side as shown in Fig. 2, controlled by a one-way pawl 7 and adapted to engage with a pin 8 projecting from a quadrant wheel 9 in engagement with a star wheel 10 integral with the pence indicating drums 11 and 111 for the operator and purchaser respectively. The said indicating drums are connected together by a sleeve, but one indicates each separate transaction to the operator on the keyboard side of the machine while the other drum indicates the same transaction to the purchaser on the other side of the machine. The indicating drums 55 and 111 indicate for the operator and purchaser respectively each separate transaction in shillings, just in the same manner as the pence indicating drums 11 and 56 indicate to the operator and purchaser respectively each separate pence transaction. The shillings indicating drums are operated through a quadrant wheel 57 corresponding with the quadrant wheel 9 on the pence side of the machine and a star wheel 54 corresponding with the star wheel 10 on the pence side of the machine. The quadrant wheel 57 is moved into engagement with the said star wheel 54 by the depression of a key lever 1 on the shillings side of the machine and the consequent operation of the corresponding cradle 5 on that side of the machine.

The spring-controlled cradle 5 on the pence side of the machine carries on the opposite side to the quadrant wheel 9, a pawl 53 shown more particularly in Fig. 7 in engagement with a wheel 50 in engagement with a pin wheel 39 integral with the pence totalizing drum 32 shown in Fig. 2. 40 indicates the shillings totalizing drum. This totalizing drum is operated through the transfer mechanism described in the specification of British Patent No. 4677 of 1915 from the pence totalizing drum. If a key lever in the bank of keys on the left hand side of the machine shown in plan view in Fig. 2 is depressed to register a transaction in shillings, this operation is transmitted through the cradle 5 on the left hand side of the machine to the shillings indicating drum 40 through the big wheel 500, pin wheel 51, star wheel 52, integral with said pin wheel 51 and pin wheel 390 integral with said shillings drum 40 without affecting the pence mechanism. The shaft 36 carries the said indicating drums 32 and 40.

In order that the cash indicating drum may be held in a position indicating the last transaction until another transaction has been completed, I arrange mechanism shown in Figs. 3 and 4 coöperating with the cash drawer 12 in such a manner that the return of the drawer to its closed position after, for instance, a transaction on the side of the machine operates a pivoted frame extending throughout the back of the machine and controlled by a spring 14. The said spring 14 allows a pawl member 15 to drop into engagement with the quadrant wheel 9 (which wheel is in engagement with the pin wheel 10 of the said cash indicating drum 11) and then engages and releases a pawl member 16 engaging the quadrant wheel 6, thus holding up in the position shown in Fig. 6 the said cradle 5 operated as above described by the movement of one or other of the bank of key levers 1 and releasing said cradle 5 and allowing it to return with the key lever to the initial position of these parts shown in Figs. 1 and 5.

The cash drawer 12 is controlled by a lever 17 controlled in turn by a spring 18 and tending to push the drawer outward, the said lever 17 having a pin 19 engaging in the fork 20 by an arm 21 pivoted at the free end of the said pivotally mounted frame 13 extending throughout the back of the machine which cradle is operated through the inward movement of the drawer as above described to move the pawl member 15 into engagement with the said quadrant wheel 9 holding the cash indicating drum 11 in the position to which it has been moved by a key 1, while releasing the said pawl member 16 retaining the key cradle 5 and key 1 from the depressed position shown in Fig. 6 and consequently allowing said key cradle 5 to move back with the key lever to the initial position shown in Fig. 5 of the drawings under the influence of the springs 22 and 23. When pushed home the drawer 12 is held in the closed position by a pivoted spring-controlled catch against the pressure of said spring-controlled lever 17 tending to push said drawer out.

The downward movement of one or other of the key levers 1 immediately operates a pivotally mounted yoke 24 extending across the front of the machine and through a lever arm 25 projecting from the said front yoke 24 trips the catch 26 retaining said drawer in the closed position by the pin 27 and arm 17, thus allowing said drawer to move forward a short distance before said pin 27 engages the second catch 28, thus allowing the said frame 13 to move as above described and to allow the pawl member 15 to engage the quadrant wheel 9, while moving the pawl member 16 out of engagement with the quadrant wheel 6. The said quadrant wheel 9 holding the cash indicating drum 10 in the position in which it was set at the last transaction. The movement of the key 1 forces the front cradle downward and lifts the lever arm 25 upward until its pin 29 engages with an arm 30 projecting from the said second catch 28 and raises said catch 28 and releases the drawer 12. The time occupied between the release of the first and second catch allows of the cash indicating drum being set for the transaction as above described before the drawer is released.

The transfer mechanism illustrated in connection with the totalizing mechanism of this cash register and seen in Fig. 2 is illustrated in more detail in Figs. 8 to 13, but no description is here necessary as it is fully described in the specification of British Patent No. 4677 A. D. 1915.

An alternative transfer mechanism herein claimed is shown in Figs. 14 and 15. In these drawings, two numeral drums are shown, 32 and 40. As a matter of fact they have twelve indications which of course will be suitable for a duodecimal adding machine. 32 is the numeral drum of the lower of the two denominations and is driven by the large tooth wheel 290 directly through the twelve pins 530 of the pin wheel 30 integral with the drum 32. On the opposite side the numeral drum 32 carries a single pin 540 which is in fact the transfer pin and engages with the nose 550 of a pawl carrying member 560, seen best in Fig. 14. The wheel 290 is driven in the direction of the arrow and therefore drives the wheel 30 in the direction of its arrow. A spring 570 connected to a pin 58 on the member 560 holds this latter normally against the stop 59. Once in each revolution, however, the pin 540 rocks the member 560 into contact with the stop bar 60, and in so doing the pawl 61 rocks the wheel 51 through the distance of one tooth, and this movement is transmitted through the wheel 52 to the numeral drum 40 of the next higher denomination. Hence for every revolution of the drum 32 the drum 40 is turned through the distance of one indication.

The drum 40 of the higher denomination is normally driven through the wheel 50 which, of course, rotates it quite independently of the mechanism connected with the lower denomination, and therefore does not interfere with the movement of the drum 32. The drive is from wheel 500, through the pin wheel 51, wheel 52, pin wheel 390. A locking pawl to prevent backward rotation is provided at 62 for wheel 30 and a similar pawl 63 for wheel 39.

It is obvious that if the mechanism is to be applied to add pounds, shillings and pence, the wheel 30 must have twelve pins, wheel 39 twenty pins, and there must be a third numeral drum to indicate pounds. The mechanism can be applied to an ordinary machine, in which case all the numeral drums bear ten indications and the pin wheels integral with them carry ten pins. Such a mechanism with suitable indications would be suitable for dollars, francs, or any other form of decimal coinage. As described all the gear wheels are pin wheels, but they could be replaced by wheels with cut teeth, which, however, would be more expensive and render the mechanism heavier.

What I claim is:

1. In a cash register, the combination of a main shaft, a plurality of banks or sets of key levers, one for each coin denomination, each pivoted on said main shaft, a plurality of spring-controlled pivoted frames each corresponding to one of said key levers and provided with actuating members operated by the inner ends of said key levers, a quadrant wheel carried by said frame, a one-way pawl pivoted to the frame of the machine and controlling said quadrant wheel, a second quadrant wheel concentric with said first-named quadrant wheel, a pin projecting from said second quadrant wheel into the path of motion of said first-named quadrant wheel, and an indicator actuated by said quadrants.

2. In a cash register, the combination of a main shaft, a plurality of banks or sets of key levers, one for each coin denomination, each pivoted on said main shaft, a plurality of spring-controlled pivoted frames each corresponding to one of said banks of keys and provided with actuating members operated by the inner ends of said keys, a quadrant wheel carried by said frame, a one-way pawl pivoted to the frame of the machine and controlling said quadrant wheel, a second quadrant wheel concentric with said first-named quadrant wheel, a pin projecting from said second quadrant wheel into the path of motion of said first-named quadrant wheel, a cash indicating drum, a shaft carrying said cash indicating drum and integral therewith, and a star wheel mounted upon said shaft and engaging with said second quadrant wheel.

3. In a cash register, the combination of a bank or set of key levers, a pivoted spring controlled frame in operative connection therewith, a quadrant wheel geared thereto, a cash indicating drum, a pin wheel integral therewith and engaging with said quadrant wheel, a spring-controlled cash drawer, a pivoted cradle extending throughout the back of the machine and operated by said cash drawer when the latter is in the closed position, a pawl member mounted upon the frame of the machine and in position to engage with said quadrant wheel when released by the action of the cash drawer upon said pivoted cradle, a second pawl adapted to retain the spring-controlled pivoted frame operated by the key levers in the proper position after a transaction, and means connecting said pawl member with the drawer operated cradle to release said pawl member when said drawer is in the closed position in order to allow the respective key lever and the spring-controlled frame connected therewith to return to the initial position.

In testimony whereof I have signed my name to this specification.

ARTHUR JOHN HERBERT BURNETT.

Copies of this patent may be obtained for five cents each, by addressing the "Commissioner of Patents, Washington, D. C."